(12) United States Patent
Albright et al.

(10) Patent No.: US 9,649,590 B2
(45) Date of Patent: May 16, 2017

(54) SYSTEM AND METHOD FOR GAS RECOVERY AND REUSE

(71) Applicant: AIR PRODUCTS AND CHEMICALS, INC., Allentown, PA (US)

(72) Inventors: Christopher Michael Albright, Allentown, PA (US); Gregory Khosrov Arslanian, Pipersville, PA (US); Andrew David Johnson, Doylestown, PA (US); David Charles Winchester, Walnutport, PA (US)

(73) Assignee: VERSUM MATERIALS US, LLC, Allentown, PA (US)

( * ) Notice: Subject to any disclaimer, the term of this patent is extended or adjusted under 35 U.S.C. 154(b) by 0 days.

(21) Appl. No.: 14/567,353

(22) Filed: Dec. 11, 2014

(65) Prior Publication Data

US 2015/0196870 A1 Jul. 16, 2015

Related U.S. Application Data

(60) Provisional application No. 61/926,649, filed on Jan. 13, 2014.

(51) Int. Cl.
*B01D 53/22* (2006.01)
*C01B 23/00* (2006.01)

(52) U.S. Cl.
CPC .......... *B01D 53/22* (2013.01); *C01B 23/0042* (2013.01); *B01D 2053/221* (2013.01); *B01D 2256/18* (2013.01); *C01B 2210/0031* (2013.01)

(58) Field of Classification Search
CPC .............. B01D 53/22; B01D 2053/221; B01D 2256/18; C01B 23/0042; C01B 2210/0031
See application file for complete search history.

(56) References Cited

U.S. PATENT DOCUMENTS

| | | | | |
|---|---|---|---|---|
| 5,452,583 | A * | 9/1995 | Schulte ............... | C03B 37/0235 62/265 |
| 5,890,376 | A * | 4/1999 | Chludzinski ........... | B01D 53/00 62/608 |
| 6,089,282 | A * | 7/2000 | Spiegelman ........... | B01D 53/00 137/256 |
| 2002/0178913 | A1* | 12/2002 | Ji ........................... | B01D 53/22 95/96 |
| 2003/0129114 | A1* | 7/2003 | Jaynes ................. | B01D 53/229 423/215.5 |
| 2004/0216609 | A1 | 11/2004 | Baksh et al. | |
| 2004/0237789 | A1 | 12/2004 | Baksh et al. | |
| 2005/0235828 | A1* | 10/2005 | Ishihara ................. | B01D 53/02 95/131 |

(Continued)

FOREIGN PATENT DOCUMENTS

| | | |
|---|---|---|
| EP | 0539149 A1 | 3/1990 |
| EP | 0601601 A1 | 6/1994 |

(Continued)

*Primary Examiner* — Jason M Greene
(74) *Attorney, Agent, or Firm* — Anne B. Kiernan

(57) ABSTRACT

Process gas(es), such as but not limited to helium, can be used in the manufacture of a variety of objects. Described herein are methods to collect, reuse, and recycle the process gas(es) that are used in the production process rather than treat these materials as waste.

16 Claims, 7 Drawing Sheets

(56) References Cited

U.S. PATENT DOCUMENTS

| | | | | |
|---|---|---|---|---|
| 2009/0185969 | A1* | 7/2009 | Lose | B01D 53/00 423/262 |
| 2010/0074820 | A1* | 3/2010 | Kimoto | B01D 53/02 423/240 R |
| 2011/0138877 | A1* | 6/2011 | McCauley | B01D 53/053 73/23.37 |
| 2012/0012201 | A1* | 1/2012 | Winchester | B01D 53/04 137/511 |
| 2012/0308462 | A1* | 12/2012 | Grant | B01D 53/04 423/262 |

FOREIGN PATENT DOCUMENTS

| | | | |
|---|---|---|---|
| EP | 0820963 | A1 | 1/1998 |
| EP | 0982273 | A2 | 3/2000 |
| EP | 1498393 | A1 | 1/2005 |
| EP | 2353698 | A1 | 8/2011 |
| JP | 2115018 | A | 3/1990 |
| JP | 02115018 | A | 4/1990 |
| JP | 06210157 | A | 8/1994 |
| JP | 10087339 | A | 4/1998 |
| JP | 2000072469 | A | 3/2000 |
| JP | 2001233607 | A | 8/2001 |
| JP | 2004536702 | A | 12/2004 |
| JP | 2005035884 | A | 2/2005 |
| JP | 2007019052 | A | 1/2007 |
| JP | 2009531163 | A | 9/2009 |
| JP | 2012529367 | A | 12/2010 |
| JP | 2012501831 | A | 1/2012 |
| JP | 2012124447 | A | 6/2012 |
| JP | 2012529367 | A | 11/2012 |
| TW | 201134544 | | 10/2011 |
| WO | 2007107004 | A1 | 9/2007 |
| WO | 2010027929 | A1 | 3/2010 |
| WO | 2010144523 | A1 | 12/2010 |

* cited by examiner

SYSTEM AND METHOD FOR GAS RECOVERY AND REUSE

CROSS-REFERENCE TO RELATED APPLICATIONS

This application claims priority benefit of U.S. Provisional Application No. 61/926,649, filed Jan. 13, 2014. The disclosure of this provisional application is hereby incorporated by reference in its entirety.

BACKGROUND OF THE INVENTION

Described herein are systems and methods for recovery of process gas(es) that are used in the manufacture of an object, such as for example, helium (He). Also described herein are systems and methods that recover and then reuse the process gas for manufacturing an object.

Helium (He) is a process gas that is used in the manufacture of a variety of objects. Because the gas is inert, has extreme melting and boiling points, and has high thermal conductivity, it is suitable for use in the manufacture of a variety of objects such as optical fibers, high-energy accelerators and silicon wafer manufacturing and for certain processes such as arc welding. While He is the second must abundant element in the Earth's atmosphere, the majority of He in the atmosphere bleeds off into space. Helium gas that is used for industrial purposes is obtained as a by-product of natural gas production.

Because helium was critical to military reconnaissance and space exploration in the mid-20th Century, Congress mandated that the government encourage private helium producers nationwide to sell their helium to the government as part of the Federal Helium Program. The United States alone produces 75 percent of the world's helium. Nearly half of that total, or roughly 30 percent of the world's helium supply, comes from the U.S. Federal Helium Reserve. The federal government, which sets helium prices, announced in April that helium prices would spike from $75.75 per thousand cubic feet (Mcf) in FY 2012 to $84 per Mcf in FY 2013. This price spike, along with an uncertain federal policy is threatening to create a shortage.

Accordingly, there is a need to provide a method, system, apparatus or combinations thereof for capturing process gas(es), such as without limitation, helium, and/or other process gases to be reused and/or recycled in a production process. There is a need in the art to reduce the costs of process gas which are delivered to a production tool. There is a further need in the art to reduce the waste of process gas(es) that are used in the production process.

BRIEF SUMMARY OF THE INVENTION

The method, system, and apparatus described herein fulfill at least one of the needs in the art. In one aspect, there is provided an apparatus for capture and recovery of a process gas from at least one production tool that uses the process gas, comprising;
  (a) at least one production tool comprising an input line for introducing a process gas wherein the at least one production tool is in electrical communication with a process controller;
  (b) an effluent line in flow communication with at least one production tool and removes a spent process gas after the object is processed in the at least one production tool;
  (c) a valve in the effluent line allowing removal of the spent process gas from the production tool;
  (d) a recovery line upstream of the valve which directs the spent process gas to a treatment line; and
  (e) the treatment line comprising a purifier wherein the spent process gas is treated in the purifier to provide a recovered process gas.

In one aspect, the apparatus described herein further comprises a recovery vessel in flow communication with the treatment line wherein the recovery vessel comprises the recovered process gas. In this aspect or an alternative aspect, the apparatus described herein further comprises introducing the recovered process gas into the at least one production tool via the input line.

In another aspect, there is provided a system for the capture and recovery of a process gas from at least one production tool that uses the process gas, comprising;
  (a) at least one production tool with one or more lines for introducing the process gas in electrical communication with a process controller;
  (b) an effluent line from the at least one production tool capable of removing the process gas introduced into the production tool;
  (c) a valve in the effluent line allowing removal of the process gas from the production tool and preventing at least a portion of the effluent from returning to the at least one production tool;
  (d) a recovery line having a connection to the at least one production tool, or the effluent line, upstream of the valve, capable of removing the process gas from the production tool or effluent line and sending it to a treatment line;
  (e) a process controller; and,
  (f) the recovery vessel which is in electrical communication with the process controller and capable of housing the recovered process gas. In one particular embodiment, the process gas comprises helium.

In a further aspect, there is provided a method for capturing and recovering a process gas, the steps comprising:
  providing a process gas to a process tool having an object to be processed therein;
  processing the object with the process gas to provide a spent process gas;
  removing the spent process gas from the process tool via an effluent line; and
  treating the spent process gas to provide a recovered process gas.

In one aspect, the method described herein further directing the recovered process gas into a recovery vessel, such as without limitation, a storage cylinder or tank to contain the recovered process gas. In this aspect or an alternative aspect, the method described herein further comprises introducing the recovered process gas into the at least one production tool via the input line.

BRIEF DESCRIPTION OF SEVERAL VIEWS OF THE DRAWINGS

The present invention will hereinafter be described in conjunction with the appended drawing figures.

DETAILED DESCRIPTION OF THE INVENTION

Figure 1:
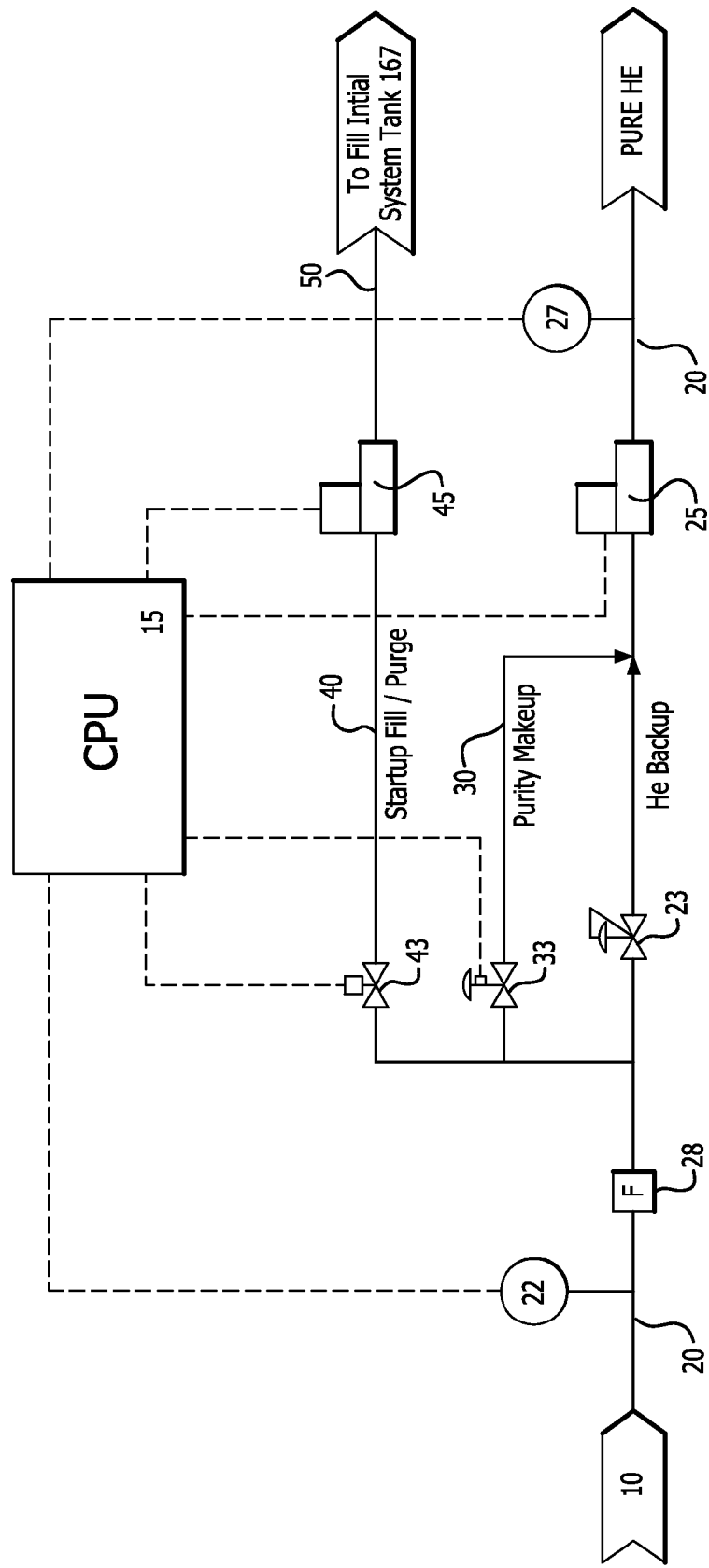
FIG. 1 provides an embodiment of the equipment, system, and method used to capture and recover a process gas such as helium from at least one production tool which shows the element of the system prior to the delivery of the recovered process gas to the at least one production tool.

Material recovery provides an opportunity to reduce the cost and amount of waste generated by production processes. Effluents from semiconductor processes, such as helium or other process gas(es) can be recovered for reuse rather than being treated as waste as is presently done. Material recovery improves the utilization efficiency of, conserves limited resources, and/or reduces the amount of waste generated by, the manufacture of an object. While the method, system and/or apparatus described herein is used for capturing and reusing helium (He) that was used in the production of an object, it is believed that the method, system, and/or apparatus described herein can be extended to other process gas(es), such as without limitation, hydrogen or one of the following noble gases, neon, argon, krypton, xenon, and/or combinations thereof. However, other process gases besides those described herein that can be subjected to purification via membrane technology can also be used in the system, method, and apparatus described herein.

Described herein is a means to recover desirable process gas(es), such as, but not limited to He, in yields that minimize production waste and allow the spent process gas(es) to be captured for re-use in the manufacturing process. The term "spent process gas" as used herein means a process gas that is used in the production of an object. In one embodiment, of the method, system, and apparatus described herein, the spent process gas is captured and then subjected to one or more of the following treatments: drying, purification, compression, storage, and/or condensation to meet the process requirements for the process gas, such as purity, humidity, particulates, pressure, volume, or other requirements to provide a recovered process gas. In one embodiment, this recovered process gas can be then reintroduced back into the production process. In an alternative embodiment, the recovered process gas can be stored for use in the same or in a different production process.

Previously, a process gas such as He is delivered to the atmosphere contained within one or more production tools for processing an object, and is directed to the product tool exhaust and disposed of as production waste. The method, system, and system described herein allows for the production waste comprising process gas, or spent process gas comprising He, to be captured into a storage vessel such as a cylinder and then removed for another use and/or reused for future production. The capture methods store the process gas or He in a vessel or recovery vessel for treatment such as purification (if needed) and subsequent re-use. The methods described herein can also remove the effluent of the at least one production tool, subject it to one or more treatments, and then re-use the treated process gas in the at least one production tool. Exemplary yields obtainable for the spent He or process gas for reuse to provide a recovered process gas using the method described include one or more of the following endpoints: 10 vol % or greater, 20 vol % or greater, 30 vol % or greater, 40 vol % or greater, 50 vol % or greater, 55 vol % or greater, 60 volume % or greater, 65 vol % or greater, 70 vol % or greater, 75 vol % or greater, 80 vol % or greater, or 90 vol % or greater based on the gross material supply. Also described herein is an apparatus, method, and system that efficiently captures the process gas or He for reuse in production.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

The term "conduit," as used in the specification and claims, refers to one or more structures through which fluids can be transported between two or more components of a system. For example, conduits can include tubes, pipes, ducts, passageways, and combinations thereof that transport liquids, vapors, gases, and combinations thereof.

The term "flow communication," as used in the specification and claims, refers to the nature of connectivity between two or more components that enables liquids, vapors, gases, or combinations thereof to be transported between the components in a controlled fashion (i.e., without leakage). Coupling two or more components such that they are in flow communication with each other can involve any suitable method known in the art, such as with the use of fittings, welds, flanged conduits, gaskets, and bolts. Two or more components may also be coupled together via other components of the system that may separate them.

The term "electrical communication" as used in the specification and claims, refers to the nature of connectivity between two or more components of the apparatus, system, or method described herein. In one embodiment, one component can be CPU central processing unit (CPU), process controller, computer, wireless signal receiver or other means that can direct, receive, or both electrical signals from one or more components within the apparatus, system, or method described herein to activate or deactivate one or more components described therein. The CPU, process controller, etc. can also monitor the system, apparatus, and/or method for compliance to certain pre-determined criteria or process requirements. For example, in the embodiment shown in FIGS. 1 through 7, CPU 15 is used, for example, to monitor certain aspects of apparatus 5 such as pressure, purity, percentage of He, and/or other parameters.

In order to aid in describing the invention, directional terms may be used in the specification and claims to describe portions of the present invention (e.g., upper, lower, left, right, etc.). These directional terms are merely intended to assist in describing and claiming the invention, and are not intended to limit the invention in any way. In addition, reference numerals that are introduced in the specification in association with a drawing figure may be repeated in one or more subsequent figures without additional description in the specification in order to provide context for other features.

Figure 5:
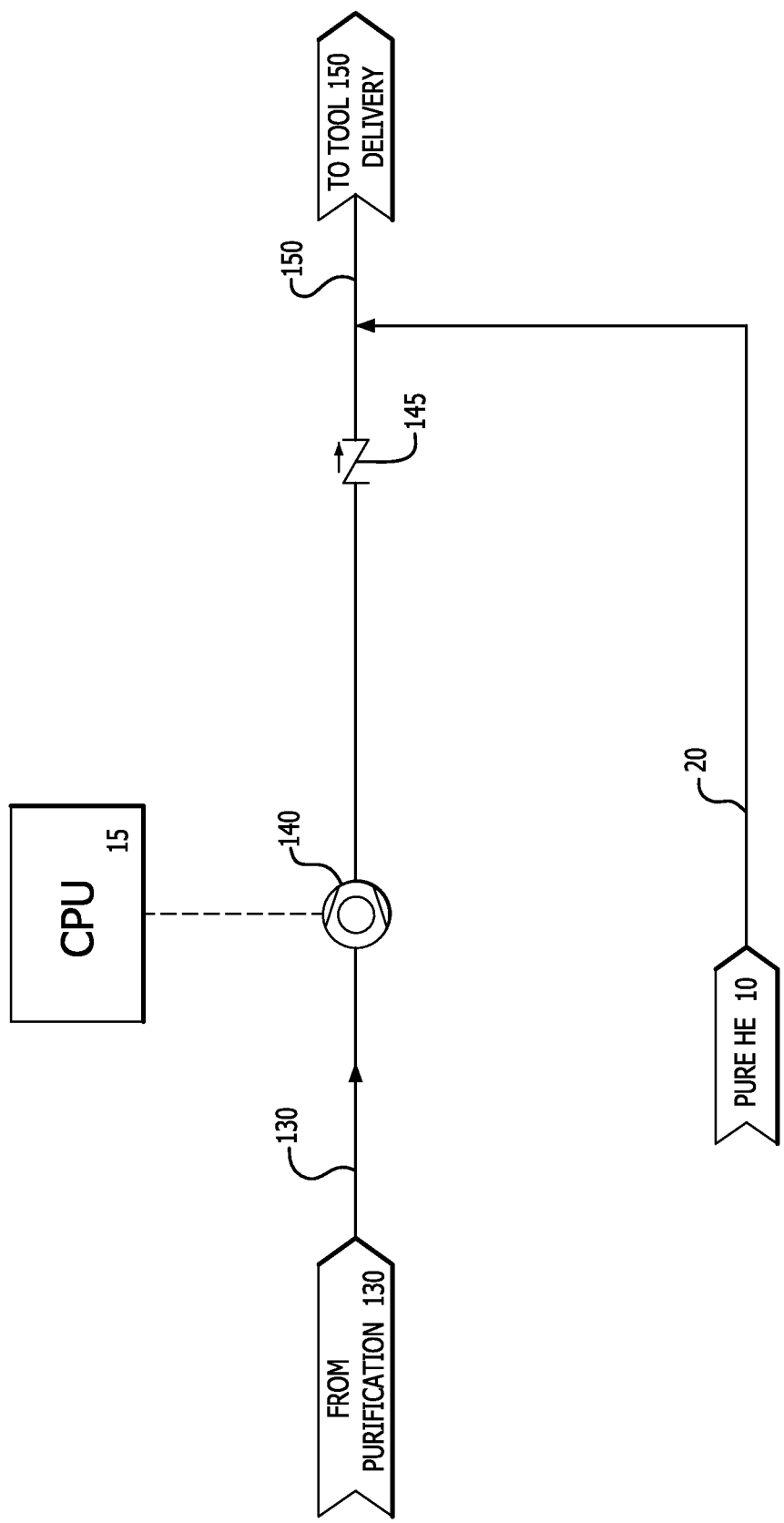
FIG. 5 shows an embodiment of the system equipment, system and method described herein depicting the treated and purified process or the recovered gas from FIG. 4 being subjected to one or more additional treatments such as compression.
Figure 7:
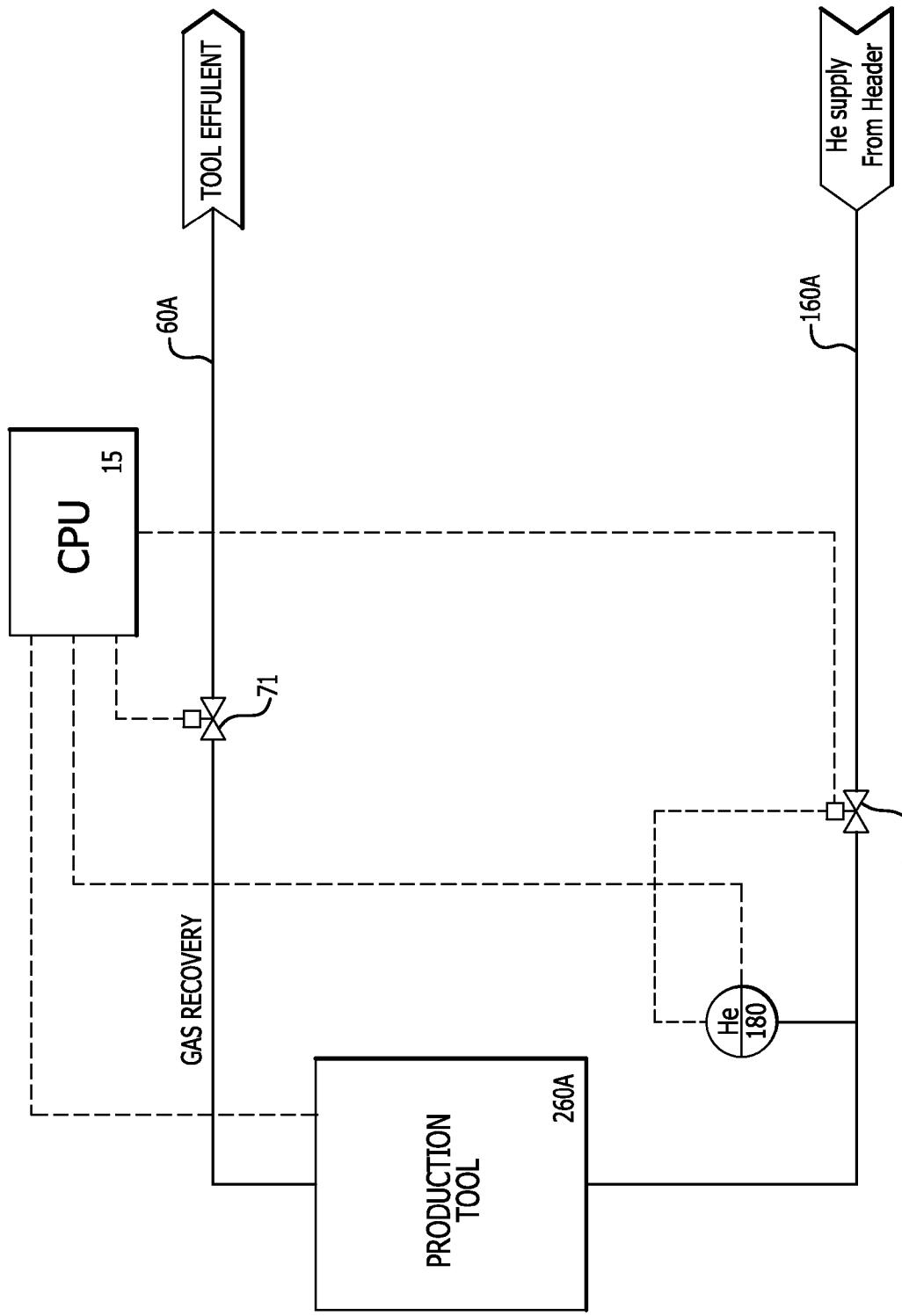
FIG. 7 an embodiment of the system equipment, system and method described herein depicting at least one production tool and the input lines for the process gas and the effluent lines for the spent process gas.

FIG. 1 provides one embodiment of the method, system, and apparatus described herein wherein the process gas comprises helium. Process gas or He is provided into the at least one production tool to process an object contained therein (which is shown in FIG. 7 as 260A). Prior to the introduction of the He to the tool, the interior volume is optionally evacuated using a vacuum system (vacuum system not shown). As FIG. 1 illustrates, He is provided as a process gas from a supply cabinet or house supply of pure He (not shown in FIG. 1) and is shown as process gas input 10. Process gas input 10 travels along feed line 20 which may further include pressure transducer 22. Pressure transducer 22 is in electrical communication with a process controller or central processing unit (CPU) 15 which directs and/or monitors the flow of process gas through the system. As shown in FIG. 1, CPU 15 is in electrical communication with pressure transducer 22 and mass flow controller 25. Feed line 20 includes particle filter 28 and may further include one or more optional check valves (not shown) to prevent the flow of process gas back into the house supply. Mass flow controller 25 controls the flow of the process gas delivered to the at least one production tool to a certain flow rate such as, for example, 130 standard cubic centimeters (sccm). However, the flow rate and other attributes for the process gas can be adjusted via the end user depending upon system requirements. Also shown in FIG. 1 is purity make-up, process line 30, having valve 33 in electrical communication with CPU 15, which acts to increase the purity of the process gas if the concentration of the gas in feed line 20 is out of process specification after being subjected to one or more treatments. Process gas from feed line 20 is introduced into the system as shown in FIG. 5 contained herein. Referring back to FIG. 1, valve 23 provides an automatic back-up in the event of a power failure to the system. Process line 40, having valve 43 in electrical communication with CPU 15, provides a further process line to provide a start-up fill/purge to the at least one production tool to avoid, for example, any production down time. Optional start-up fill or purge line 40 further includes a mass flow controller 45 and is in flow communication with a recovery manifold/He purge line 50. Recovery manifold/He purge line 50 is introduced into the system at the elements shown in FIG. 2.

Figure 2:
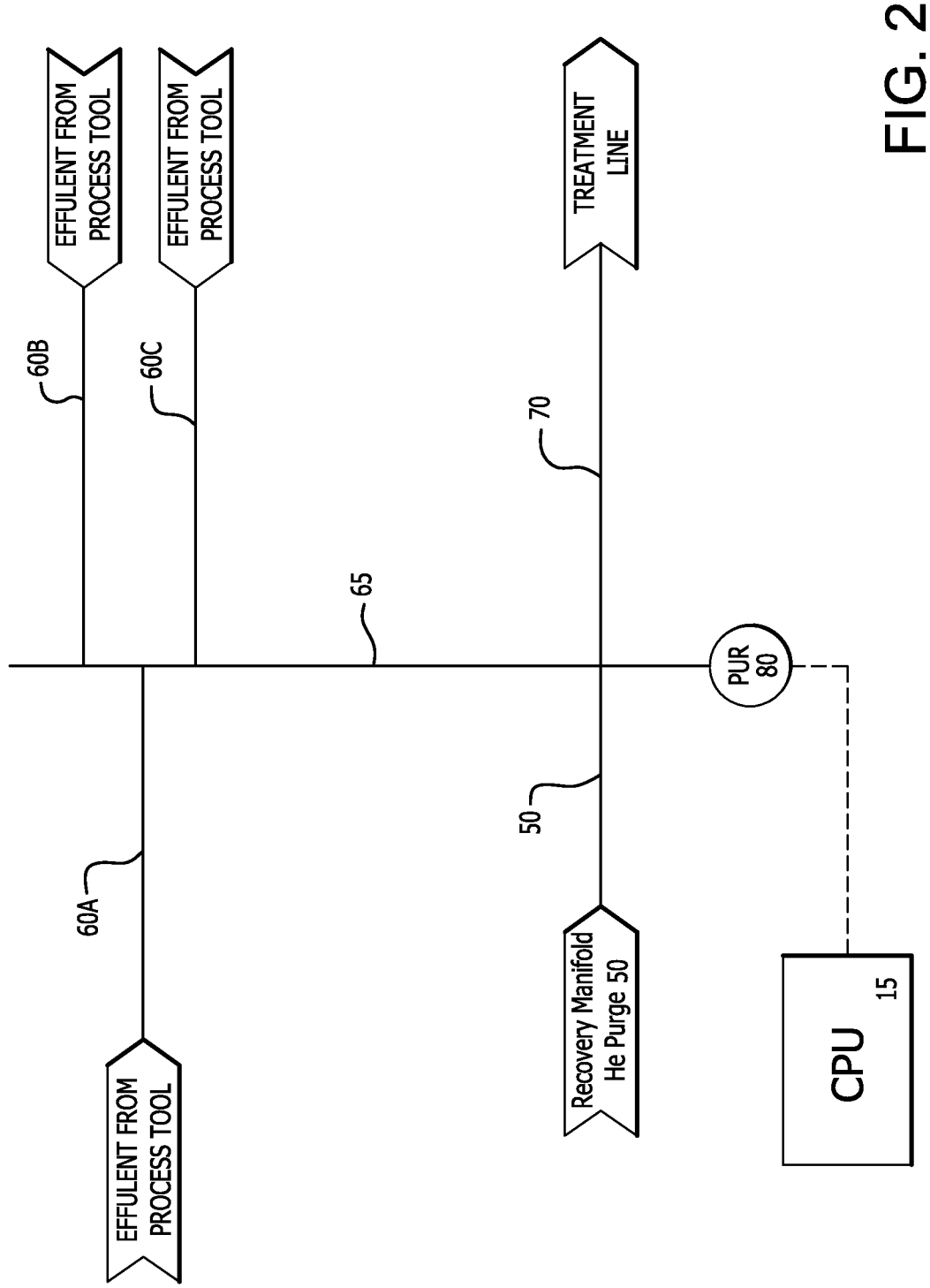
FIG. 2 shows an embodiment of the system equipment, system and method described herein depicting the recovery of a spent process gas from a plurality of production tools and the effluent lines associated thereto which are then directed to a further system to be treated.

FIG. 2 depicts a plurality of effluent lines which are identified as 60a, 60b, and 60c that the method, system and apparatus described herein recaptures the spent process gas from a plurality of production tools after the process gas has been used in the production tools in the manufacture of an object (shown in FIG. 7 as production tool 260A). The process gas flows or spent process gas from tool effluent lines 60a through 60c from multiple production tools are combined into a main header effluent line 65. A pure process gas is delivered from the system shown in FIG. 1 through process line (e.g., recovery manifold He purge) 50 into main effluent line 65. After the process gas is used in the one or more production tools, the spent process gas is directed back through tool effluent lines 60a-60c and combined into main effluent line 65 through treatment line 70 to be treated by one or more processes such as, without limitation, purification. In the embodiment shown in FIG. 2, sensor 80 provides a real-time measurement of the purity of the spent recovery process gas coming out of the at least one production tool. In one embodiment, sensor 80 is in electrical communication with a process controller such as CPU 15 shown. In one particular embodiment, the system is run at sub-atmospheric pressure (e.g., −2 psig or 700 Torr) to minimize loss of the process gas. In other embodiments, a vacuum pump (not shown) can be used to withdraw the spent process gas from at least one process tool. Main effluent line 65 is in flow communication with treatment line 70.

Figure 3:
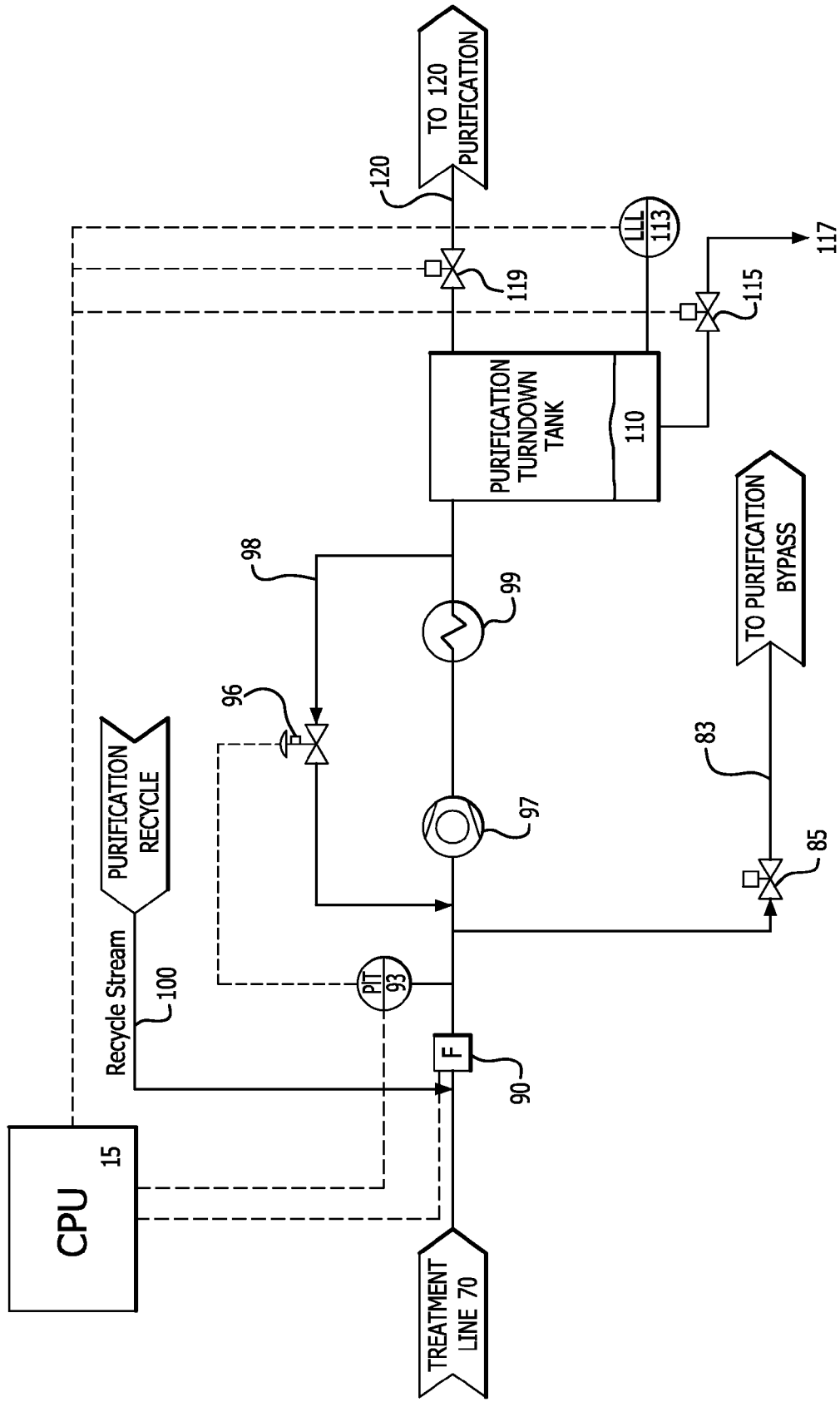
FIG. 3 shows an embodiment of the system equipment, system and method described herein depicting the spent process gas being subjected to one or more treatments.

FIG. 3 depicts the aspect of the system wherein the spent process gas in main effluent line 65 is sent to be treated through treatment line 70. Treatment line 70 further comprises filter 90 to remove any particulates contained therein and a pressure sensor 93. Filter 90 and pressure sensor 93 may further be in electrical communication with the process controller such as CPU 15 shown to allow the end user to monitor the flow and other aspects of the process gas throughout the system. In the embodiment shown in FIG. 3, pressure sensor 93 are in electrical communication with valve 96 in pressure control line 98. FIG. 3 further shows process gas inputs depicted as purification recycle line 100 (which comes from the purification system shown in FIG. 4) wherein the treated process gas, that fails to meet one or more of system requirements, is reintroduced back into the treatment cycle. Treatment line 70 comprises a purification turndown tank 110 which comprises a liquid level sensor 113 and an automatic drain valve 115 which directs any overflow of water into a condensate drain 117. Purification turndown tank 110 collects water that is removed from treatment line 70. Treatment line 70 also comprises compressor 97 and cooler 99. Compressor 97 acts to manage the input pressure by recycling a portion of the gas to ensure treatment line 70 maintains consistent pressure. Cooler 99 removes heat and water from the process gas and optionally may comprise a humidity control valve (not shown). Treatment line 70 further comprises a purification bypass line 83 which comprises a valve 85. Purification bypass line 83 allows the end user to supplement the main input header going to the at least one production tool (shown in FIG. 7) to reach the process requirements for the input to at least one production tool. For example, the outputs from the system monitoring which is measured and analyzed by the process controller determine that the purity of the treated spent process gas is sufficient, the purification bypass allows this gas to be directed to the at least one product tool without requiring purification. This improves the overall efficiency of the system. After the spent process gas is compressed and subsequently dried, it is then directed into purification line 120 through valve 119. As FIG. 3 shows, valve 119, valve 115, liquid level sensor 113, filter 90, and pressure transducer 93, are in electrical communication with CPU 15.

Figure 4:
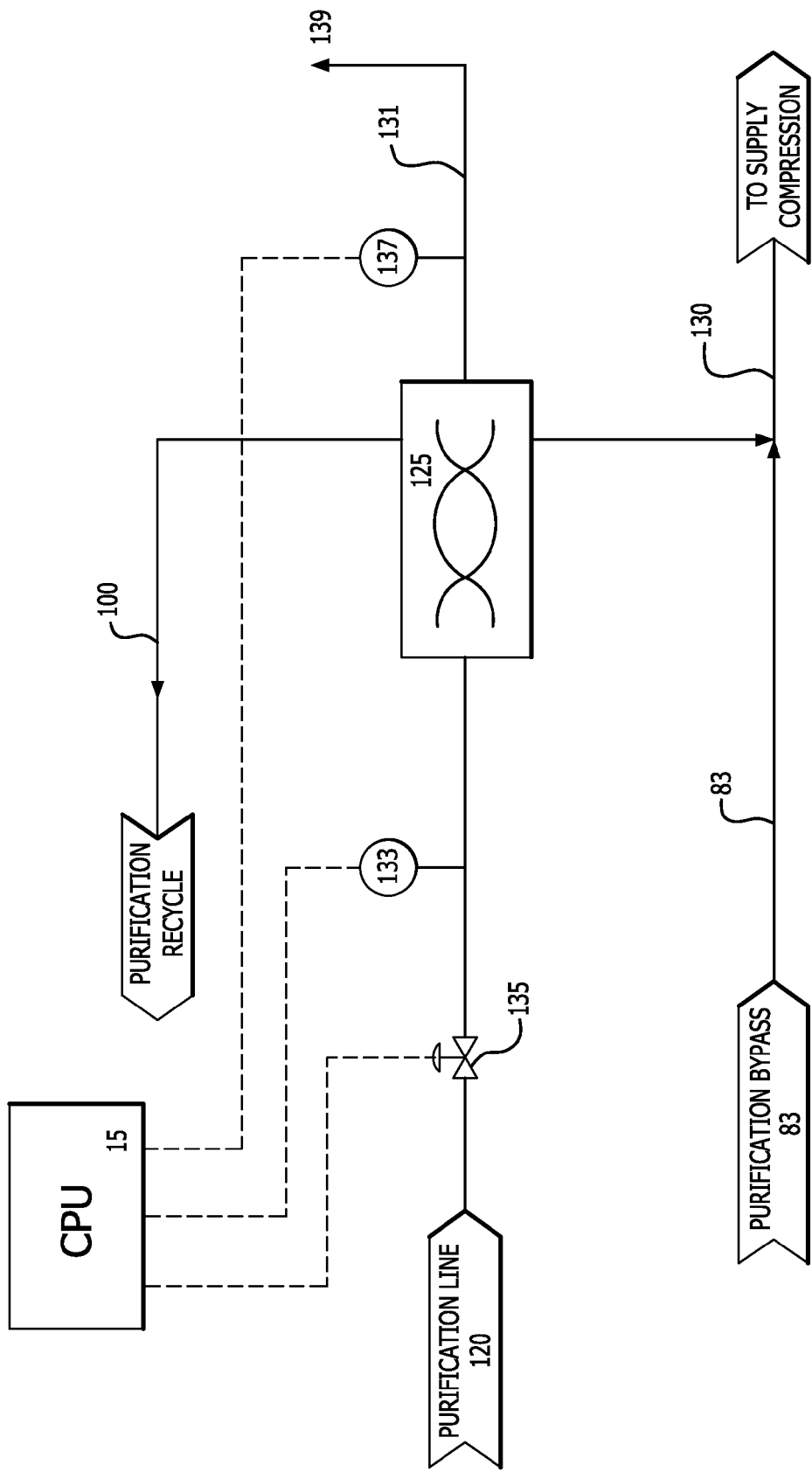
FIG. 4 shows an embodiment of the system equipment, system and method described herein depicting the treated process gas from FIG. 3 being subjected to one or more additional treatments such as purification.

FIG. 4 shows the treatment of the spent process gas which is subjected to purification. In the system shown in FIG. 4, the spent process gas is subjected to purification via one or more membranes. Other purification methods can be used such as absorption, adsorption, distillation or similar means. It is envisioned that one or more alternative or supplemental treatment methods can be adopted depending upon the system requirements. Purification line 120 from FIG. 3 is introduced into one or more purifiers 125 depending upon the production needs. Purification line 120 comprises pressure transducer 137 and valve 135 depending upon the purification method selected. In the embodiment shown in FIG. 4, the system uses membrane purification in purifier 125 which requires maintaining and calculating the flow of the process gas at various points throughout the system. This aspect can be controlled using a process controller shown as CPU 15 which is in electrical communication with one or more of the following elements: purifier 125, transducer 133, transducer 137, and regulator 135. FIG. 4 depicts purification bypass line 83 (which is shown in FIG. 3) which is blended with purified end product which is shown as end product line 130. Purification bypass line 83 is used when the purity of the process gas is sufficient to not require purification. FIG. 4 also depicts a vent line 131 which vents the contaminants contained within the process gas through vent 139 which were introduced into the system via main effluent line 65 (shown in FIG. 2). Lastly, FIG. 4 shows recycle stream 100 which directs out of specification process gas 100 (e.g., process gas that fails to meet one or more of the process requirements) out of purifier 125, through regulator 137, and reintroduces the treated process gas back into the treatment system shown in FIG. 3.

Figure 6:
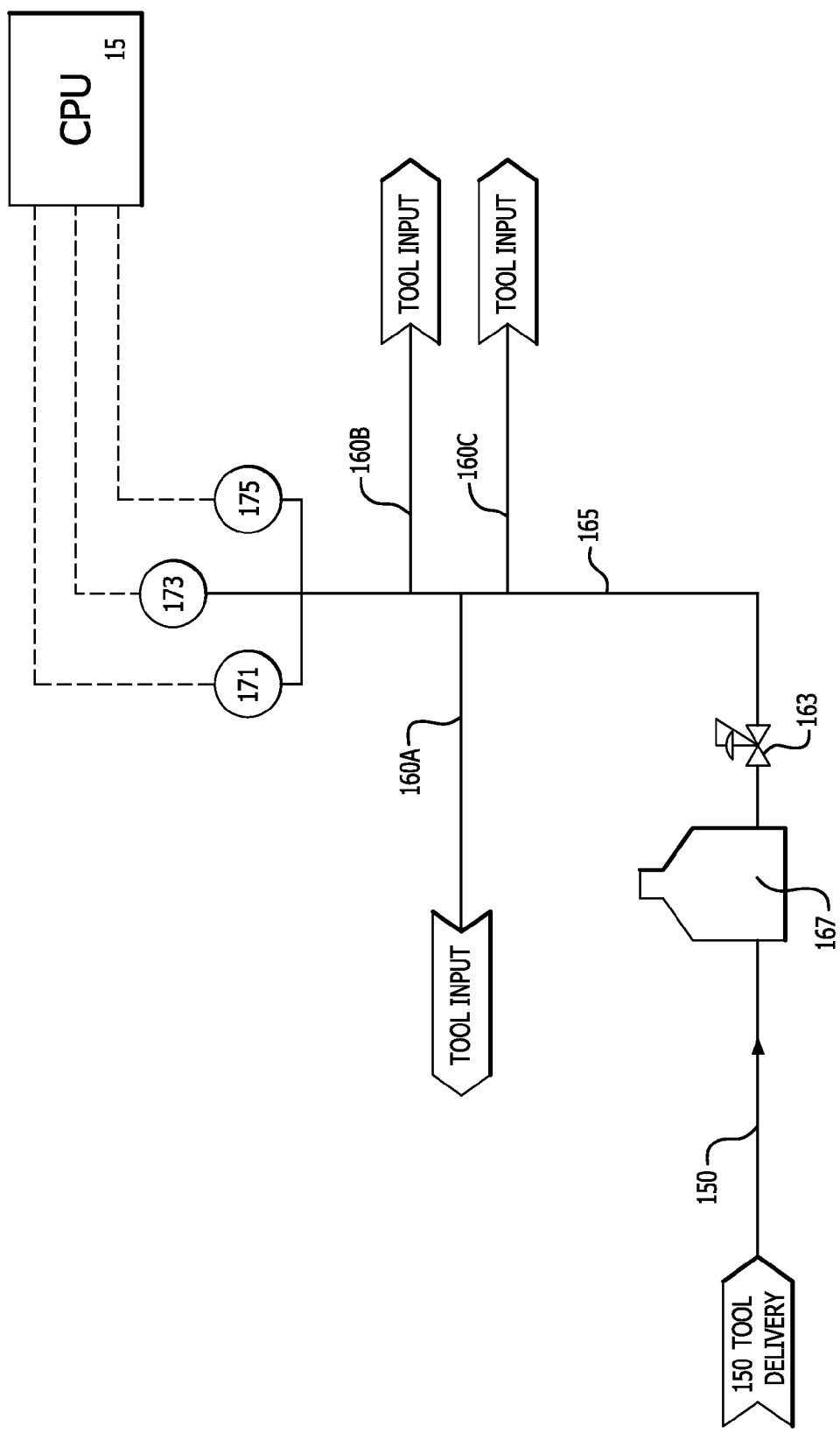
FIG. 6 shows an embodiment of the system equipment, system and method described herein depicting the recovered process gas from FIG. 5 being directed to a manifold in flow communication with a plurality of process tools.

FIG. 5 shows the purified end product 130 from the system shown in FIG. 4 being introduced into the compressor 140 which can then be reintroduced into at least one production tool through main input line 165 in FIG. 6. Compressor 140 adjusts the pressure of the incoming gas to meet production tool requirements to provide a compressed end gas shown as 150. FIG. 5 further depicts a check valve 145 which prevents back flow of pure helium from feed line 20 (shown in FIG. 1) from back flowing into the compressor. Pure He may be introduced into the system at this point if the purity of the treated process gas does not meet system requirements. In certain embodiments not shown, the compressed end product gas may be post processed such as directing into a hydration cycle to adjust moisture control. In this or other embodiments, the end product compressed gas may be further blended with one or more gases prior to reintroduction into the at least one or more production tools depending upon system requirements.

FIG. 6 shows the compressed end product gas 150 being directed to at least one production tool (shown in FIG. 7 as 260A). Compressed end product gas line 150 further comprises tank 167 which captures any excess helium prior to delivery to the main gas input header or manifold 165 and control valve 163 which maintains the required delivery pressure to the tool. Tank 167 further allows all of the process gas contained within the production tools and lines to be captured in the event of system failure. Main gas header 165 is in flow communication with tool input lines 160A through 160C. The system further comprises sensors 171, 173, and 175 which are sensors which monitor oxygen ($O_2$), water ($H_2O$), and pressure flow. These sensors are in electrical communication with a process controller such as CPU 15 shown.

FIG. 7 depicts the at least one production tool 260 which shows the compressed end product gas 165 being supplied from main gas header into product tool input line 160A and wherein the spent process gas is removed from at least one product tool 260A after processing an object (not shown) through gas recovery line or tool effluent line 60A. Product tool input line 160A further comprises valve 181. Gas recovery line further includes one or more valves such as valve 71. In addition, gas recovery line may include an optional back-pressure regulator (not shown) which prevents excess flow of spent process gas to the recovery system. FIG. 7 further depicts purity sensor 180 which is in electrical communication with a process controller such as CPU 15 shown that allows the at least one production tool 260A to be isolated in the event of out of specification process gas and/or system failures by closing valve 181 shown. As FIG. 7 shows, valve 181, valve 71, production tool 260, and purity sensor 180, are in electrical communication with CPU 15.

While the principles of the invention have been described above in connection with preferred embodiments, it is to be clearly understood that this description is made only by way of example and not as a limitation of the scope of the invention.

The invention claimed is:

1. An apparatus for the recovery of a process gas used in the production of an object from at least one production tool, comprising;
    (a) at least one production tool used in the production of an object comprising an input line for introducing a process gas, the process gas having a concentration of a first gas that is greater than or equal to a first concentration, wherein the at least one production tool is in electrical communication with a process controller;
    (b) an effluent line in flow communication with the at least one production tool, wherein the effluent line removes a spent process gas after the object is processed in the at least one production tool;
    (c) a recovery line operationally configured to deliver at least a portion of the spent process gas to a treatment line;
    (d) the treatment line comprising a purifier wherein the spent process gas is treated in the purifier to provide a recovered process gas;
    (e) a purification bypass line operationally configured to deliver at least a portion of the spent process gas to the input line without an intermediate purification process; and
    (f) an end product gas line configured for introducing the recovered process gas into the at least one production tool via the input line.

2. The apparatus of claim 1 further comprising a recovery vessel in flow communication with the treatment line wherein the recovery vessel comprises the recovered process gas.

3. The apparatus of claim 1 further comprising a compressor configured to compress the recovered process gas prior to introducing the recovered process gas into the at least one production tool.

4. The apparatus of claim 1 wherein the process gas comprises helium.

5. The apparatus of claim 1 wherein the purifier is a membrane purifier.

6. A method for capturing and recovering a process gas that is used in the manufacture of an object, the steps comprising:
    providing a process gas via an input line to a process tool having an object to be processed therein, the process gas having a concentration of a first gas that is greater than or equal to a first concentration;
    processing the object with the process gas to provide a spent process gas comprising a second concentration of the first gas;
    removing the spent process gas from the process tool via an effluent line;
    determining the second concentration of the first gas in the spent process gas;
    delivering at least a portion of the spent process gas to the input line without purifying the at least a portion of the spent process gas if the determined concentration of the first gas in the spent process gas is equal to or greater than the first concentration; and purifying at least a portion of the spent process gas to provide a recovered process gas if the determined concentration of the first gas in the spent process gas is less than the first concentration.

7. The method of claim 6 further comprising directing the recovered process gas into a recovery vessel.

8. The method of claim 7 wherein the recovery vessel is selected from a storage cylinder or a storage tank.

9. The method of claim 6 further comprising introducing the recovered process gas into the at least one production tool via the input line.

10. The method of claim 6 wherein the spent process gas is treated via a purifier.

11. The apparatus of claim 1 wherein the process gas comprises neon.

12. The method of claim 6 wherein the process gas comprises helium.

13. The method of claim 6 wherein the spent process gas is treated by compression.

14. The apparatus of claim 1, further comprising a purity make-up process line comprising at least one valve in electrical communication with the process controller, wherein the purity make-up process line is in flow communication with a reservoir of the first gas and the input line.

15. The apparatus of claim 1, further comprising a sensor in the effluent line which determines a concentration of the first gas in the spent process gas, wherein the recovery line is operationally configured to deliver the at least a portion of the spent process gas to the treatment line if the determined concentration of the first gas in the spent process gas is less than the first concentration, and wherein the purification bypass line is operationally configured to deliver the at least a portion of the spent process gas to the input line without an intermediate purification process if the determined concentration of the first gas in the spent process gas is equal to or greater than the first concentration.

16. The method of claim 6, further comprising mixing the recovered process gas with a make-up stream of the first gas, before supplying the recovered process gas to the input line, if the determined concentration of the first gas in the recovered process gas is less than a second concentration.

* * * * *